United States Patent [19]

Niedospial, Jr. et al.

[11] Patent Number: 5,305,042
[45] Date of Patent: Apr. 19, 1994

[54] FILM CASSETTE

[75] Inventors: John J. Niedospial, Jr., Princeton Junction, N.J.; Christopher T. Mattson, Rochester, N.Y.; Russell J. Butler, Dansville, N.Y.; Christopher McCormick, Rochester, N.Y.

[73] Assignee: Eastman Kodak Company, Rochester, N.Y.

[21] Appl. No.: 41,062

[22] Filed: Mar. 31, 1993

[51] Int. Cl.⁵ ............................................. G03B 17/26
[52] U.S. Cl. ..................................... 354/275; 242/71.1
[58] Field of Search ......................... 354/275; 242/71.1

[56] References Cited

U.S. PATENT DOCUMENTS

| | | | |
|---|---|---|---|
| 3,804,351 | 4/1974 | Kaneko et al. | 242/199 |
| 4,407,579 | 10/1983 | Huff | 354/275 |
| 5,003,334 | 3/1991 | Pagano et al. | 354/275 |
| 5,031,852 | 7/1991 | Dowling et al. | 242/71.1 |
| 5,040,739 | 8/1991 | Wolf et al. | 242/71.1 |
| 5,151,730 | 9/1992 | Kemp et al. | 354/275 |

*Primary Examiner*—Monroe H. Hayes
*Attorney, Agent, or Firm*—Roger A. Fields

[57] ABSTRACT

A film cassette comprises a cassette shell, a spool core supported inside the cassette shell for rotation in an unwinding direction to advance a filmstrip coiled about the spool core out of the cassette shell and in a winding direction to draw the filmstrip into the cassette shell, at least one flange coaxially coupled with the spool core to prevent the filmstrip from uncoiling about the spool core and to permit the flange and the spool core to be rotated relative to each other in the unwinding and winding directions, and cooperating means located on the spool core and the flange for fixing the flange and the spool core to each other to make the flange rotate with the spool core in the unwinding direction but releasing the flange to permit it and the spool core to be rotated relative to each other in the winding direction. According to the invention, stop means are connected to the cassette shell, and the flange has engageable means for being engaged by the stop means when the flange is rotated with the spool core in the winding direction to prevent the flange from further rotating in that direction, whereby the flange will impose a frictional drag on the filmstrip as the filmstrip is wound onto the spool core to cause the filmstrip to be wound tightly to the spool core.

5 Claims, 12 Drawing Sheets

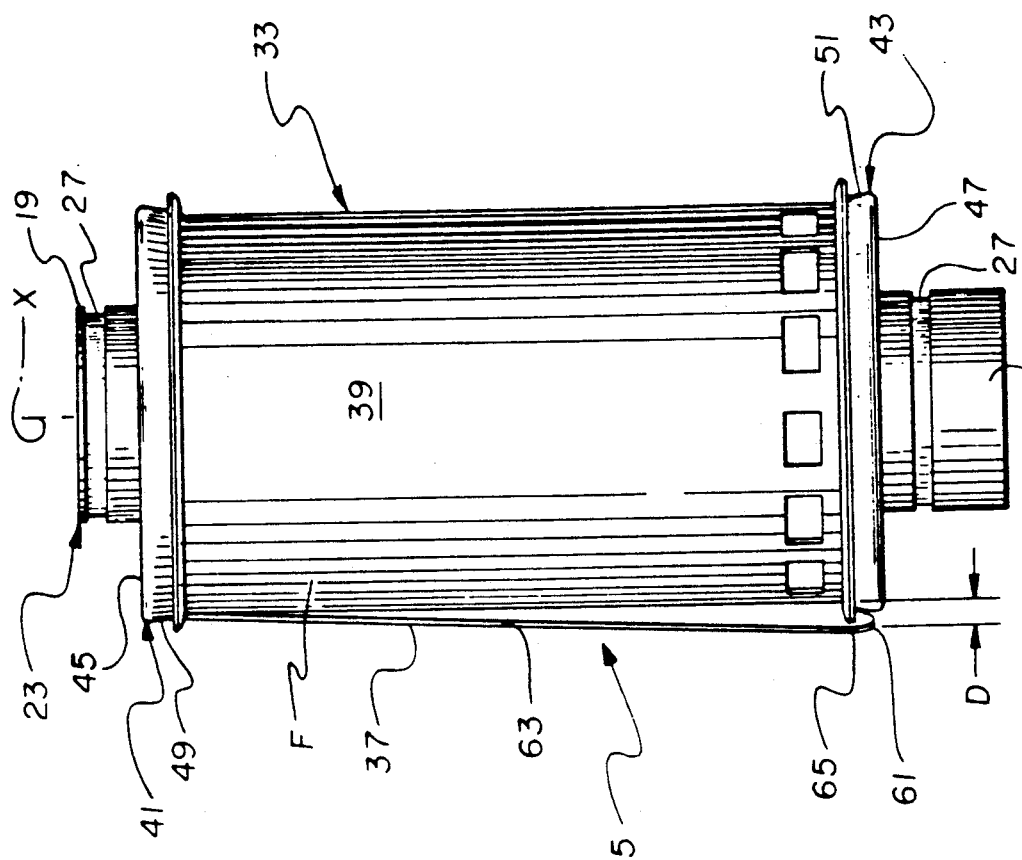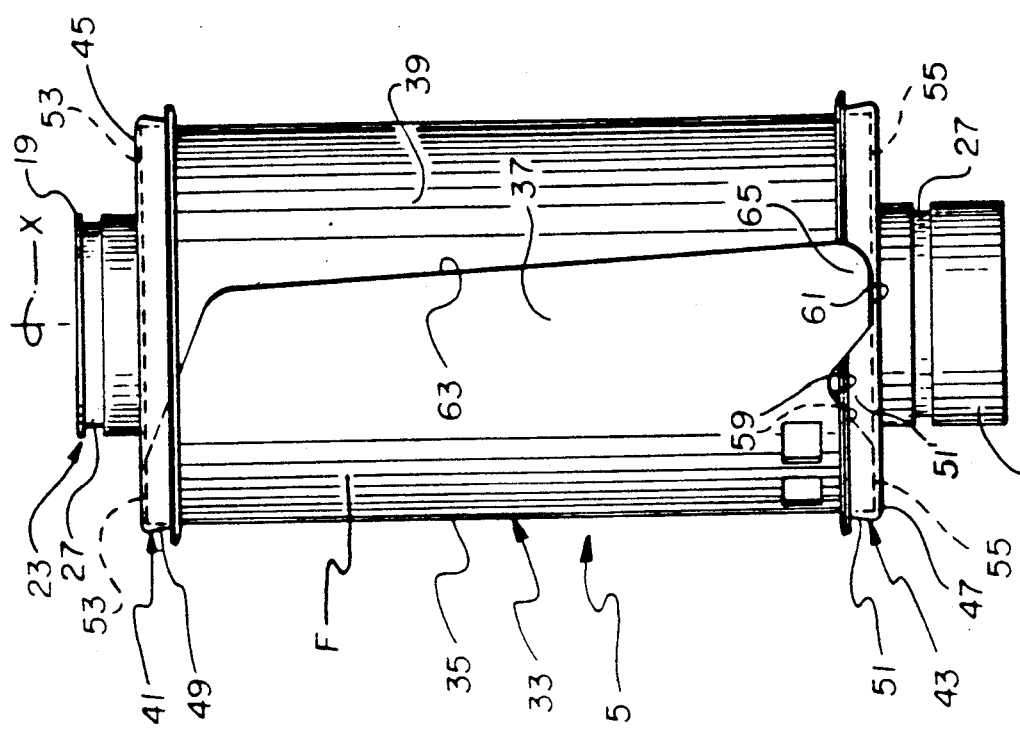

FILM CASSETTE

BACKGROUND OF THE INVENTION

1. Field of the Invention

The invention relates generally to the field of photography, and in particular to a film cassette containing a film roll. More specifically, the invention relates to a film cassette that is capable of advancing a filmstrip including a non-protruding leader portion out of the cassette shell when a spool core about which the filmstrip is coiled is rotated in an unwinding direction.

2. Description of the Prior Art

Commonly assigned U.S. Pats. No. 5,151,730, issued Sep.29, 1992, No. 5,040,739, issued Aug. 20, 1991, and No. 5,151,730, issued Feb. 15, 1991, disclose a film cassette that is capable of advancing a filmstrip including a non-protruding leader portion out of the cassette shell. As can be seen from a reading of the patents, the film cassette includes a spool core supported inside the cassette shell for rotation in an unwinding direction to advance a filmstrip coiled about the spool core out of the cassette shell and in a winding direction to draw the filmstrip into the cassette shell, and a pair of flexible flanges coaxially arranged along the spool core to overlie opposite sides of the film roll to radially confine the film roll within skirted peripheries or annular lips of the flanges. The two flanges have respective central openings through which the spool core coaxially extends to permit the flanges and the spool core to be independently rotated in the two directions. A film stripper projects from the cassette shell to be received underneath a leading end of the leader portion when the spool core is rotated in the unwinding direction, to free the leader portion from the radial confinement of the flanges by inducing the leader portion to flex the flanges slightly away from each other at their skirted peripheries. Several engagement hooks are fixed to the spool core for rotation with the spool core relative to the flanges, to move into engagement with at least one of the flanges when the spool core is rotated in the unwinding direction, to make the engaged flange(s) rotate in unity with the spool core in the unwinding direction, and for movement out of engagement with the engaged flange(s) when the spool core is rotated in the winding direction, to permit the flanges and the spool core to be independently rotated in the winding direction.

It has been recognized that by fixing at least one of the flanges to the spool core during unwinding rotation of the spool core, as contrasted with allowing the flanges and the spool core to be independently rotated in the unwinding direction as in commonly assigned U.S. Pat. Nos. 4,834,306 and 4,848,693, there is immediately affected a frictional relationship between the outermost convolution of the film roll and the skirted periphery(s) of the engaged flange(s) which improves the ability of the spool core to the cassette shell. In particular, the frictional relationship increases the pushing force necessary to thrust the leader portion out of the cassette shell.

PROBLEM TO BE SOLVED BY THE INVENTION

When the spool core is rotated in the winding direction to draw the filmstrip into the cassette shell, the filmstrip may not necessarily be wound tightly or evenly onto the spool core. This possible problem may arise, for example, when the filmstrip is repeatedly subjected to a "stick/slip" phenomenon as it is pulled over a magnetic head, roller, or other device in a camera.

SUMMARY OF THE INVENTION

According to the invention, a film cassette comprising a cassette shell, a spool core supported inside the cassette shell for rotation in an unwinding direction to advance a filmstrip coiled about the spool core out of the cassette shell and in a winding direction to draw the filmstrip into the cassette shell, at least one flange coaxially coupled with the spool core to prevent the filmstrip from uncoiling about the spool core and to permit the flange and the spool core to be rotated relative to each other in the unwinding and winding directions, and cooperating means located on the spool core and the flange for fixing the flange and the spool core to each other to make the flange rotate with the spool core in the unwinding direction but releasing the flange to permit it and the spool core to be rotated relative to each other in the winding direction, is characterized in that:

stop means are connected to the cassette shell; and the flange has engageable means for being engaged by the stop means when the flange is rotated with the spool core in the winding direction to prevent the flange from further rotating in that direction, whereby the flange will impose a frictional drag on the filmstrip as the filmstrip is wound onto the spool core to cause the filmstrip to be wound tightly to the spool core. Thus, the invention provides a solution the problem existing in the prior art.

BRIEF DESCRIPTION OF THE DRAWINGS

FIGS. 8 and 9 are elevation views of the film roll and the film spool, illustrating the manner in which the film roll is originally stored on the film spool;

DETAILED DESCRIPTION OF THE PREFERRED EMBODIMENT

The invention is disclosed as being embodied preferably in a film cassette. Because the features of this type of film cassette are generally well known, the description which follows is directed in particular to elements forming part of or cooperating directly with the disclosed embodiment. It is to be understood, however, that other elements not specifically shown or described may take various forms known to persons of ordinary skill in the art.

Figure 1:
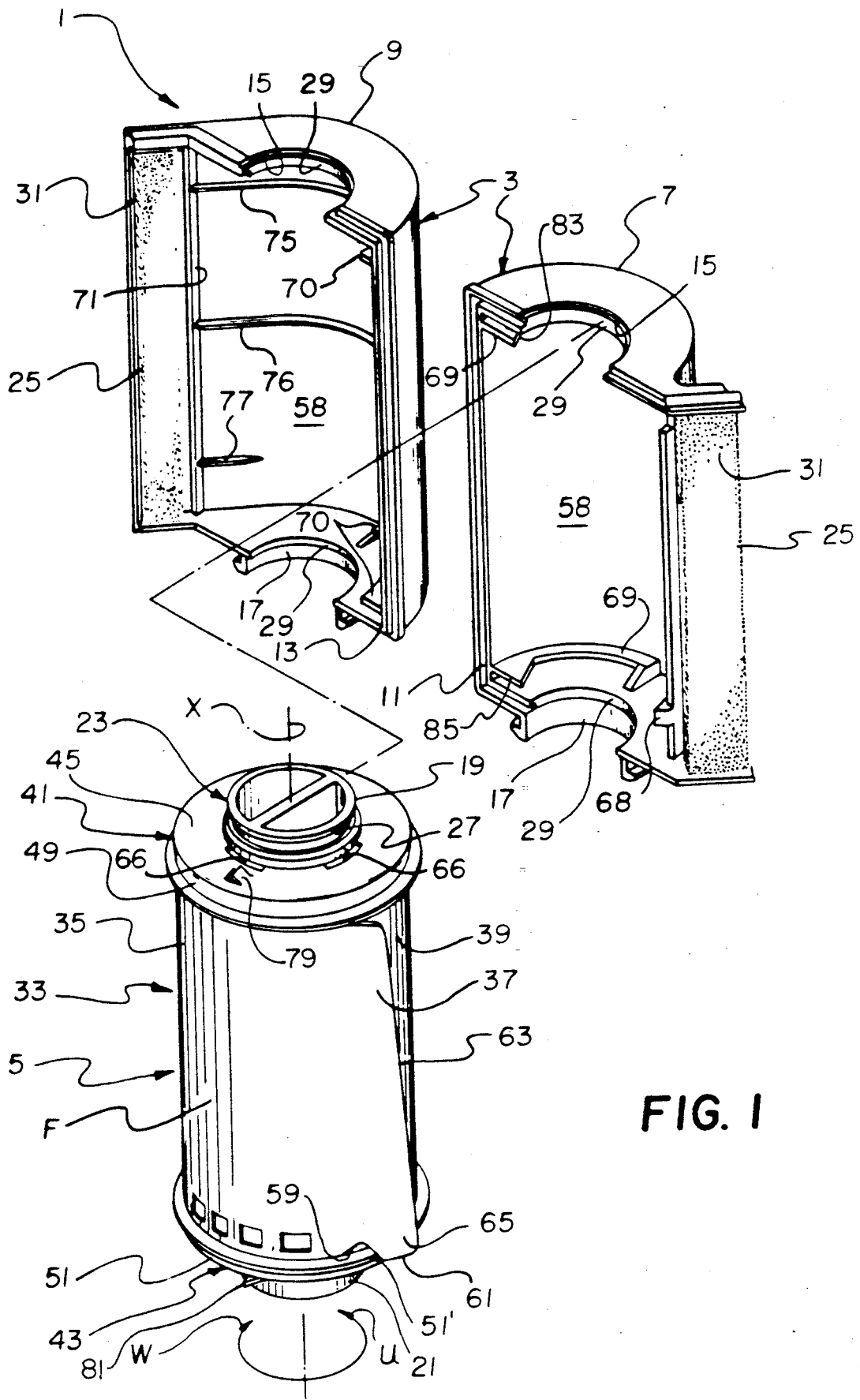
FIG. 1 is an exploded perspective view of a film cassette according to a preferred embodiment of the invention.
Figure 2:
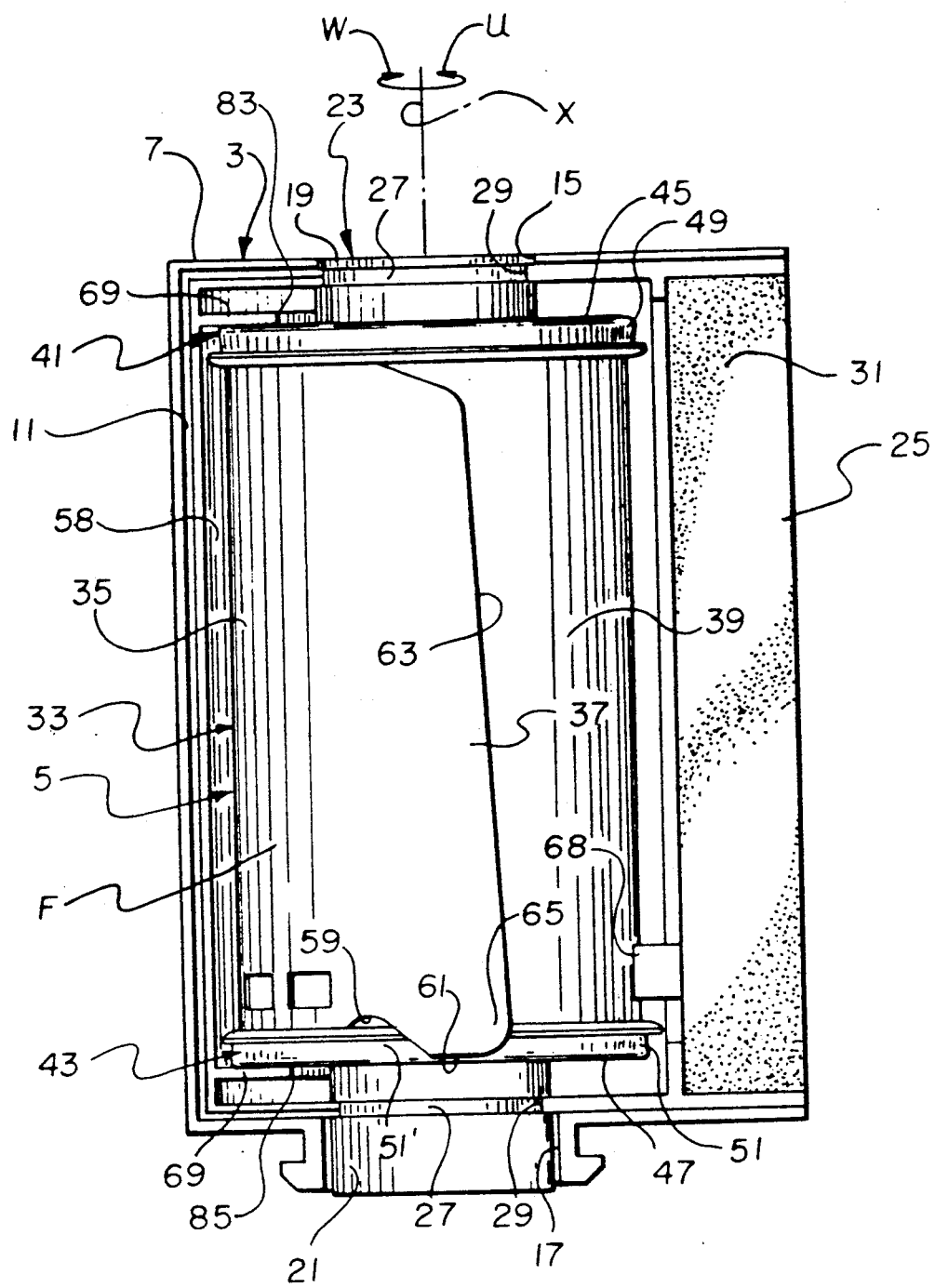
FIG. 2 is an elevation view of the film cassette, illustrating the cassette shell open to reveal a filmstrip coiled in a film roll about a film spool.
Figure 12:
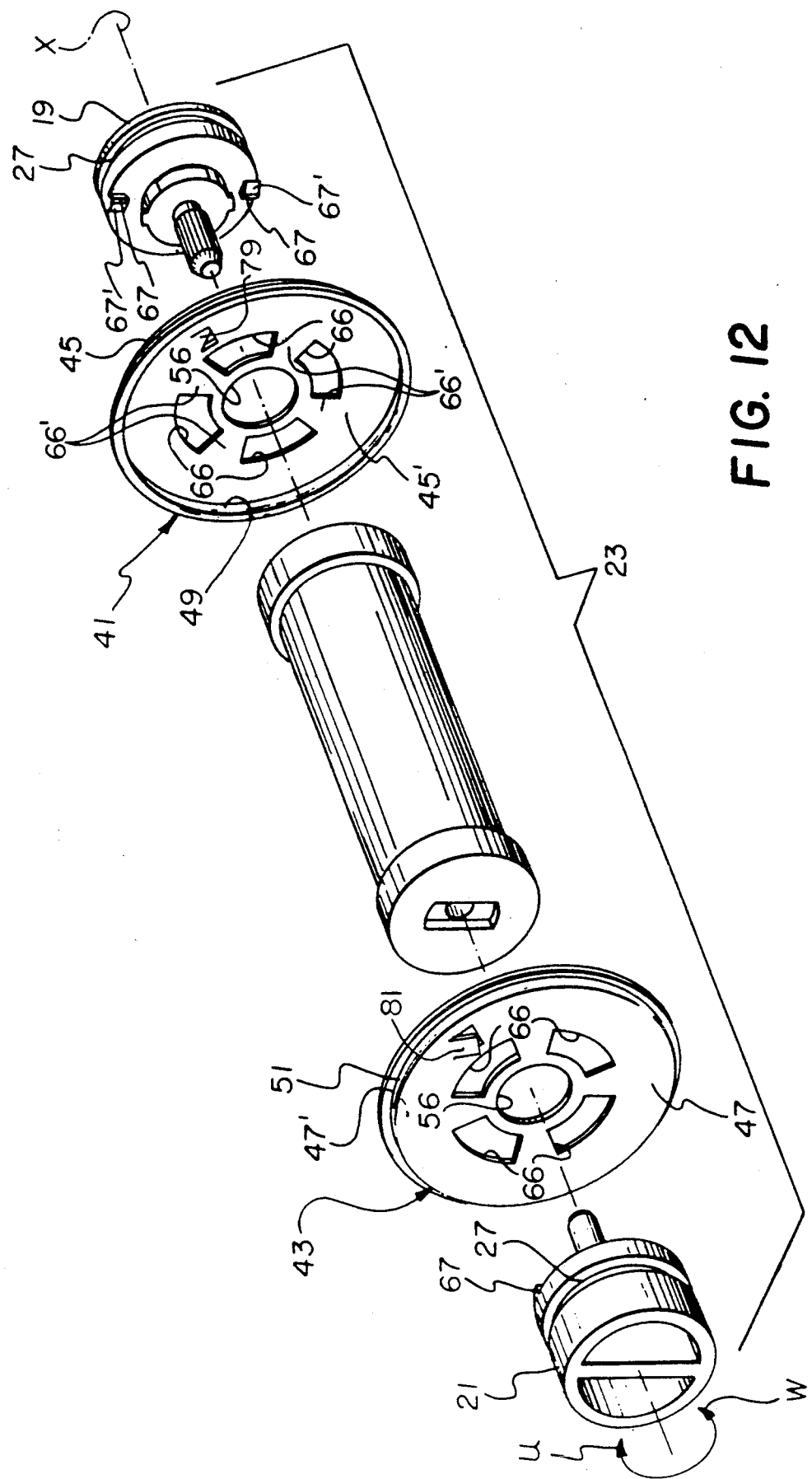
FIG. 12 is an exploded perspective view of the film spool without the film roll.

Referring now to the drawings, FIGS. 1, 2 and 12 depict a film cassette 1 comprising a light-tight cassette shell 3 and a film spool 5 which is rotatable about an axis X in film unwinding and winding directions U and W within the cassette shell. The cassette shell 3 consists of two shell halves 7 and 9 which are mated along respective grooved and stepped edge portions 11 and 13. The mated halves 7 and 9 define upper and lower aligned circular openings 15 and 17 for relatively shorter and longer opposite open-end pieces 19 and 21 of a spool core or hub 23, and they define a narrow relatively straight film passageway 25 to the exterior of the cassette shell 3. The longer and shorter open-end pieces 19 and 21 of the spool core 23 each include an annular peripheral groove 27 which mates with a corresponding edge portion 29 of the respective openings 15 and 17 in the cassette shell 3 to rotatably support the film spool 5 for rotation about the axis X in the film unwinding and winding directions U and W. A known black velvet or plush material 31 lines the interior of the film passageway 25 to prevent ambient light from entering the film passageway. Alternatively, a light-tight door can be used.

Figure 3:
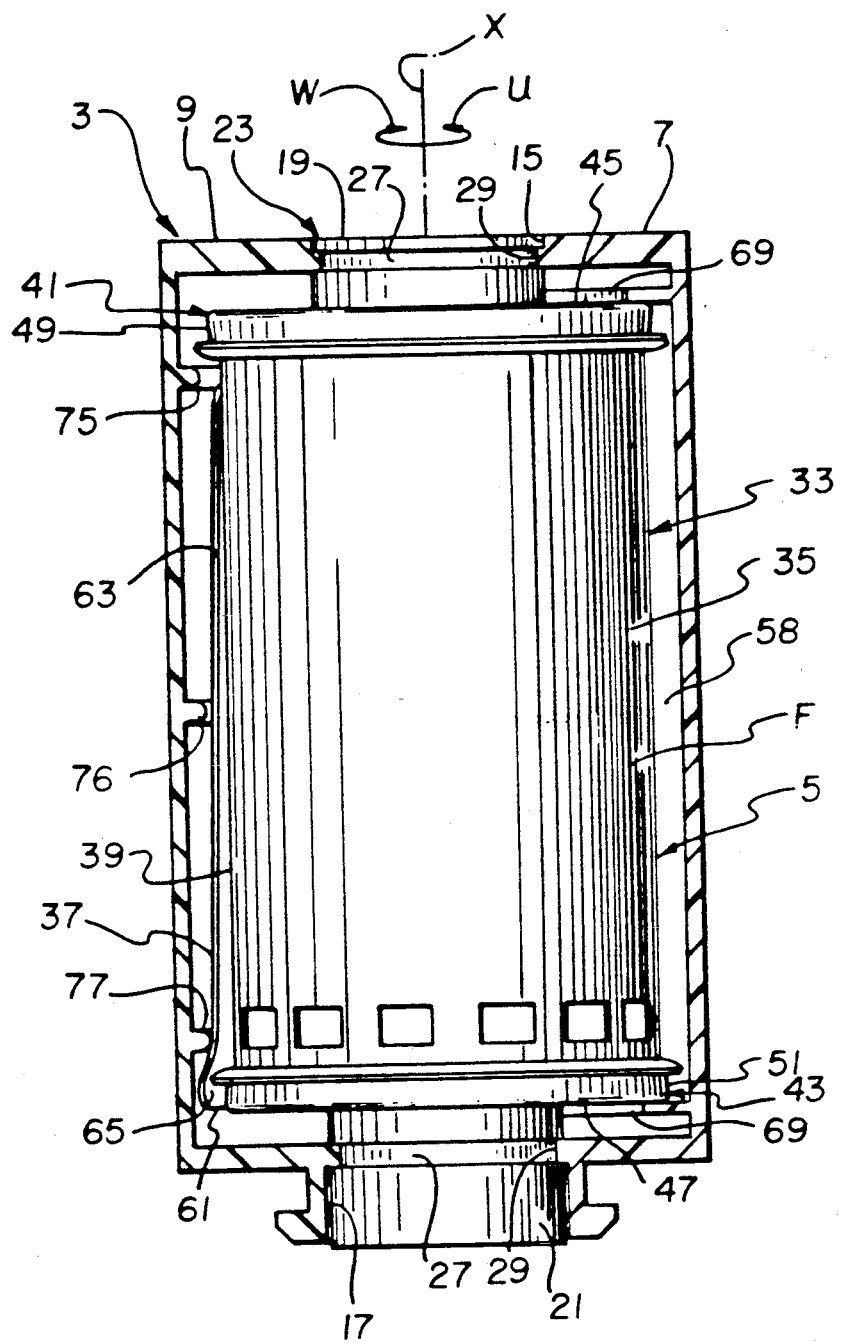
FIG. 3 is an elevation view similar to FIG. 2, through in section.
Figure 13:
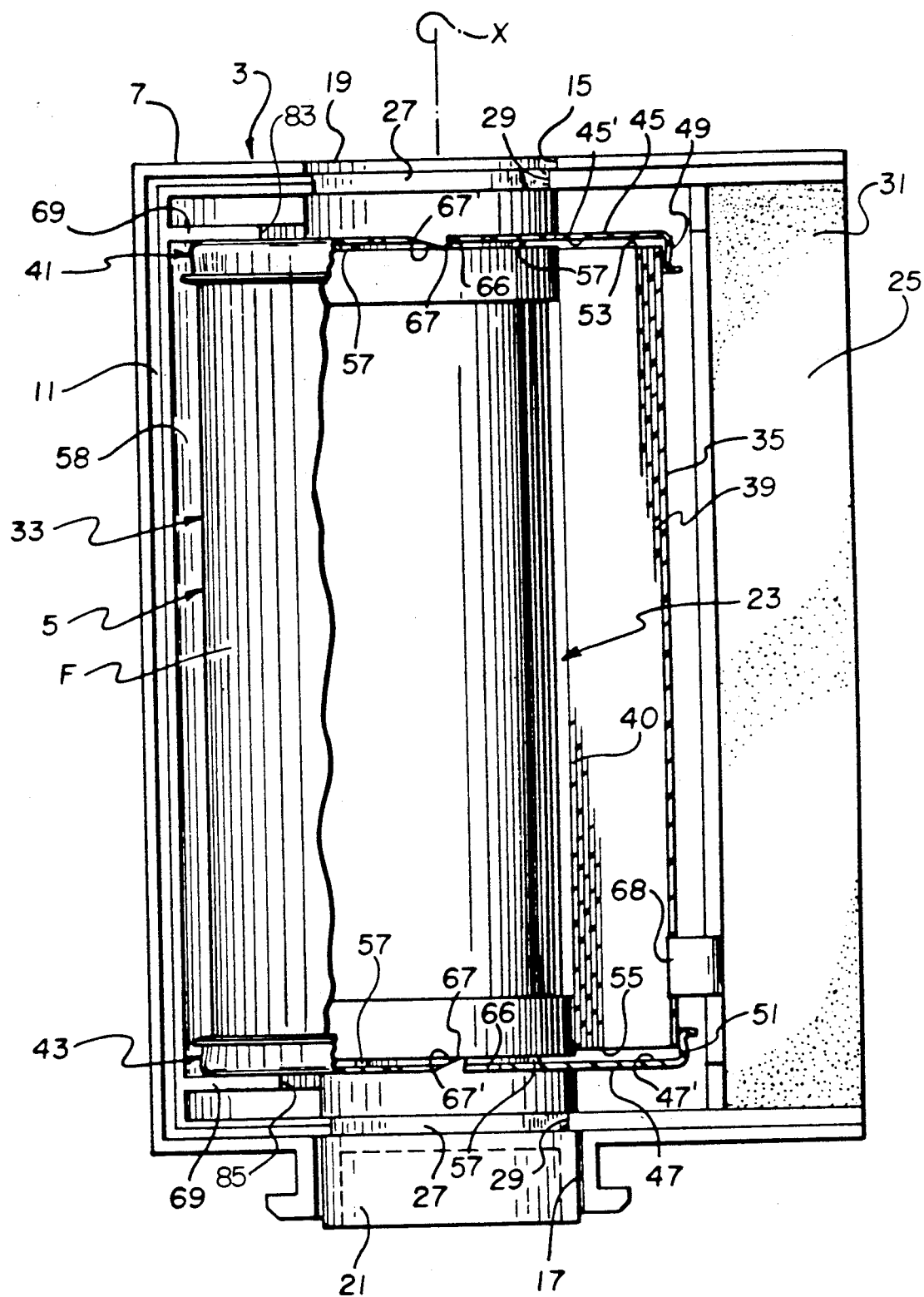
FIG. 13 is an elevation view partly in section of the film roll and the film spool, illustrating the manner in which a pair of film confining flanges of the spool may be fixed via respective engagement hooks to the spool for concurrent rotation with the spool.

A roll 33 of 35 mm filmstrip F is coiled about the spool core 23 to form successive film convolutions. As shown in FIG. 3, the film roll 33 includes an outermost convolution which comprises a film leader or leader portion 35 having a leading or forward end 37, and it includes a next-inward convolution 39 coiled behind the outermost convolution. The inner or trailing end of an innermost convolution 40 of the film roll 33 is secured to the spool core 23 using known attachment means, not shown. See FIG. 13.

Figure 14:
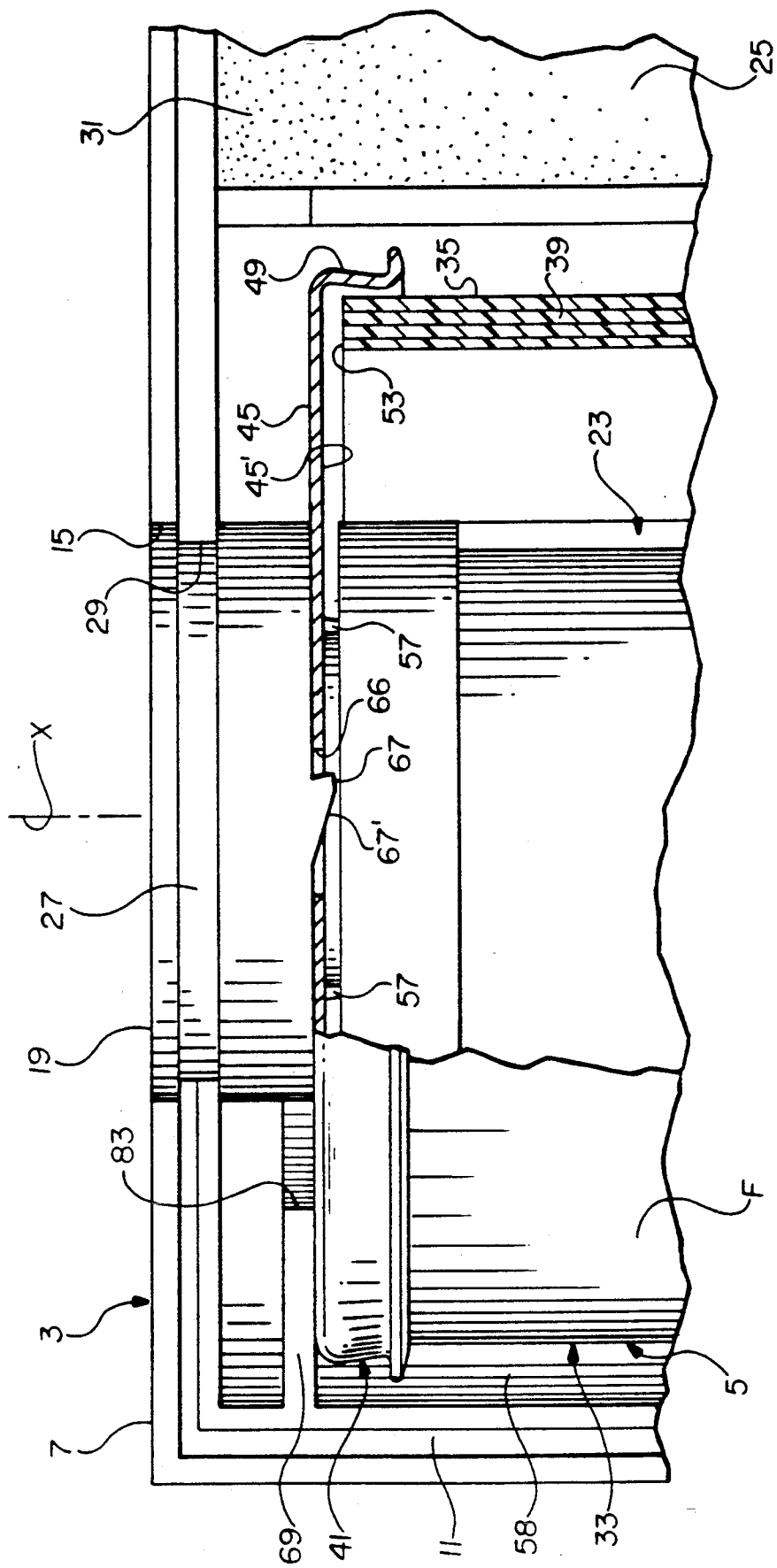
FIG. 14 is a blow-up of a particular portion of FIG. 13, illustrating one of the engagement hooks engaging one of the film confining flanges.
Figure 15:
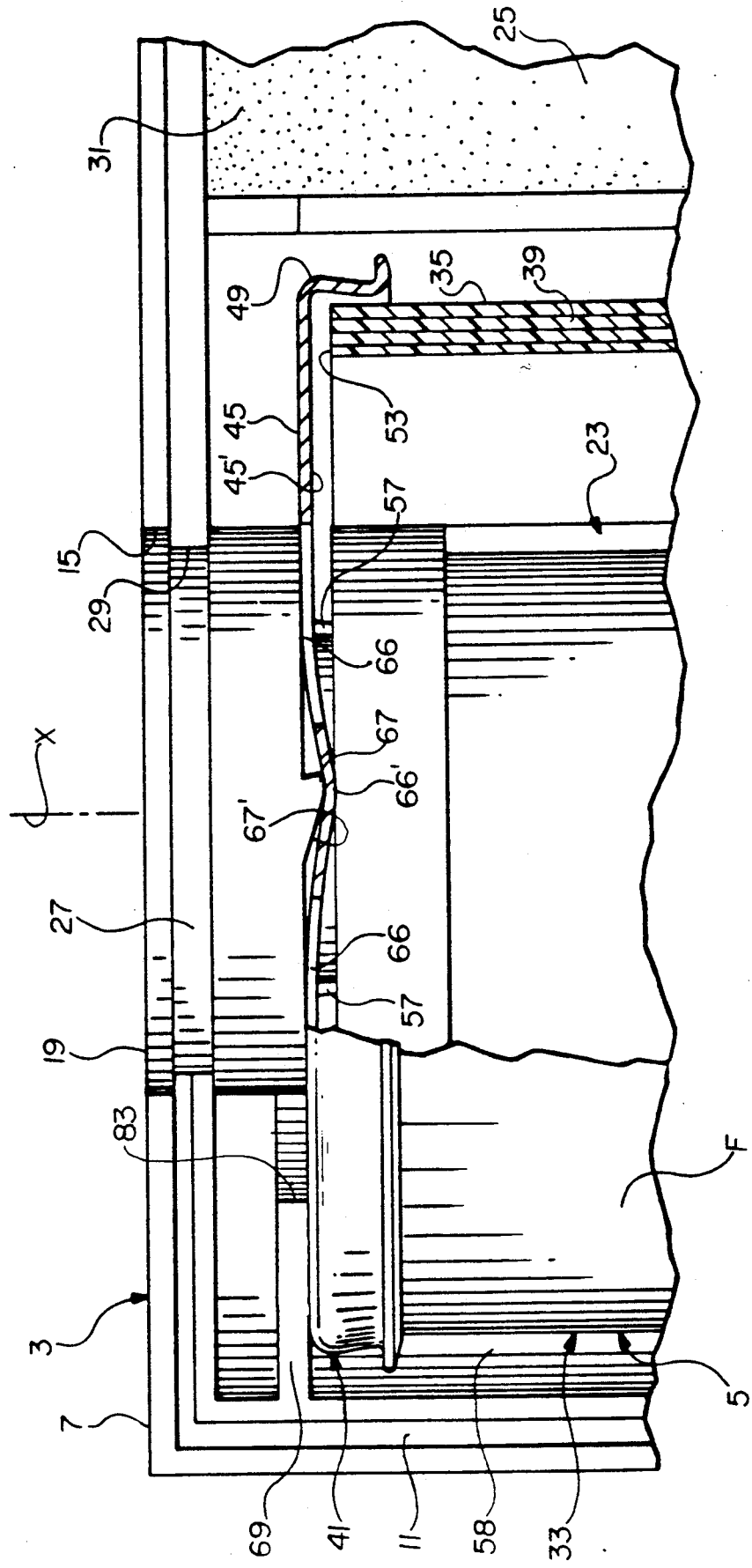
FIG. 15 is a blow-up similar to FIG. 14, illustrating the engagement hook not engaging the film confining flange.

A pair of upper and lower identical, very thin, flexible film constraining flanges 41 and 43 are coaxially spaced along the spool core 23 as shown in FIGS. 1, 2, 8, 12 and 13. The two flanges 41 and 43 comprise respective integral disks 45 and 47 and respective integral annular lips or skirts 49 and 51 which circumferentially extend from the disks. The two disks 45 and 47 cover opposite substantially flat sides of the film roll 33 which are defined by corresponding opposite longitudinal edges 53 and 55 of each successive convolution of the film roll, and they have respective central holes 56 through which the spool core 23 coaxially extends to permit rotation of the spool core relative to the flanges 41 and 43. Respective pairs of supports 57, 57 and 57, 57 are fixed to the spool core 23 to support the flanges 41 and 43 at their disks 45 and 47. See FIGS. 12-14. The two pairs of supports 57, 57 and 57, 57 are sufficiently spaced from one another along the spool core 23 to maintain respective inner faces 45' and 47' of the disks 45 and 47 spaced from the longitudinal edges 53 and 55 of each successive convolution of the film roll 33. See FIG. 13. The annular lips 49 and 51 overlap the film leader (outermost convolution) 35 of the film roll 33 radially outwardly of the longitudinal edges 53 and 55 of the leader to radially confine the leader to prevent it from radially expanding or clock-springing into substantial contact with an interior curved wall 58 of the cassette shell 3. A lip-receiving notch 59 is cut in the film leader (outermost convolution) 35 along its longitudinal edge 55, relatively close to its leading end 37, to receive a peripheral section 51' of the annular lip 51. This allows a relatively short edge-section 61 of the film leader (outermost convolution) 35 connecting the leading end 37 and the notch 59 to overlap the annular lip 51 radially outwardly to maintain the leading end spaced a radial distance D from the next-inward convolution 39 of the film roll 33. See FIGS. 4 and 9. The leading end 37 has a forward edge 63 inclined from the longitudinal edge 53 of the film leader (outermost convolution) 35 to the other longitudinal edge 55 of the leader to form a forward-most tip or tab 65 of the leader which, like the edge-section 61, overlaps the annular lip 51 radially outwardly. See FIGS. 1, 2, 8 and 9.

The two flanges 41 and 43 have a plurality of concentric arcuate slots 66 cut in their respective disks 45 and 47 to longitudinally extend in the film unwinding and film winding directions U and W. Engagement devices in the form of respective hook-like members 67, located on the short and longer open-end pieces 19 and 21 of the spool core 3, are normally located in the concentric slots 66 for movement along the slots into engagement with the flanges 41 and 43 responsive to rotation of the spool core relative to the flanges in the unwinding direction U, to similarly rotate the flanges, and for movement out of the slots to move out of engagement with the flanges responsive to rotation of the spool core relative to the flanges in the winding direction W, to permit the spool core to rotate independent of the flanges. See FIGS. 12–15. Preferably, each of the hook-like members 67 has an end face 67' that is beveled to ease the hook-like member out of one of the concentric slots 66 responsive to rotation of the spool core 23 relative to the flanges 41 and 43 in the winding direction W.

The two pairs of supports 57, 57 and 57, 57 are positioned to distort the flanges 41 and 43 at their disks 45 and 47 when the hook-like members 67 are not in the slots 66. See FIG. 15. More specifically, in this instance, the two pairs of supports 57, 57 and 57, 57 distort the flanges 45 and 47 in a manner such that respective flat areas 66' of the disks located between the slots 66 are urged firmly against the hook-like members 67. This will ensure that the hook-like members 67 are received in the slots 66 when the spool core 23 is rotated relative to the flanges 45 and 47 in the unwinding direction W, and therefore will engage the flanges. See FIG. 14.

Figure 4:
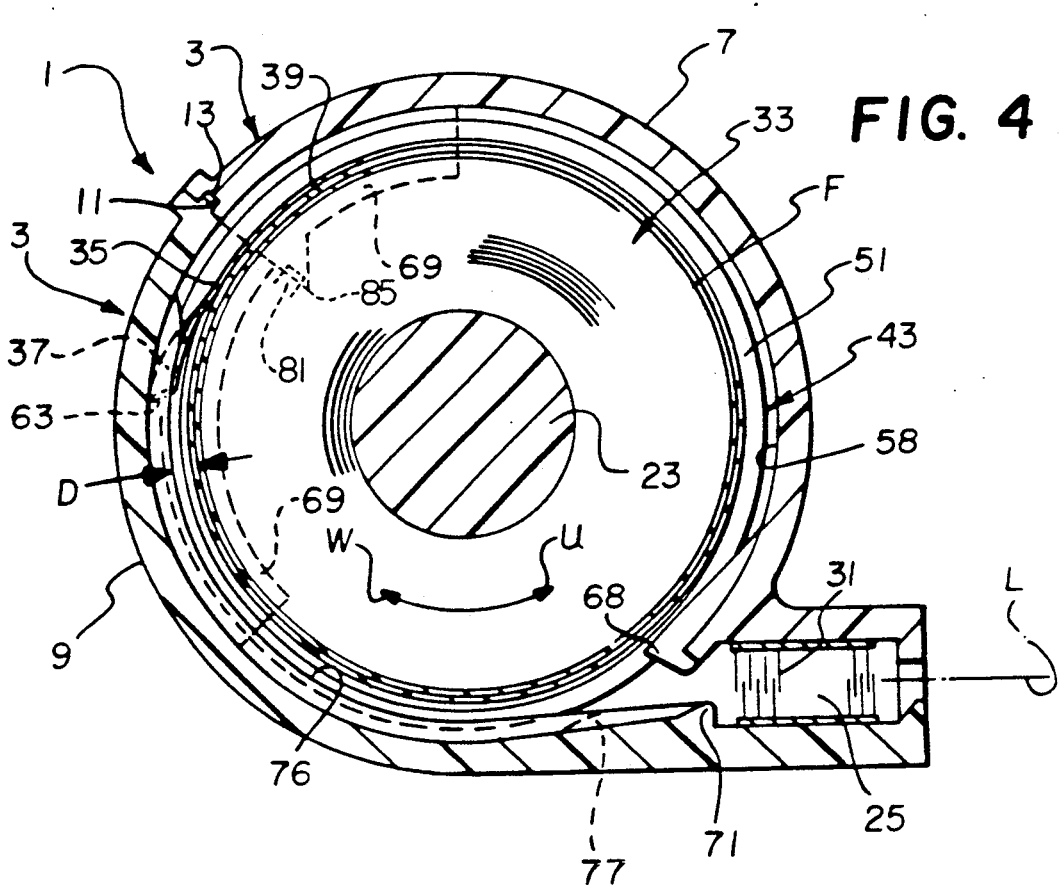
FIG. 4 is an end view partly in section of the cassette shell, the film roll and the film spool, illustrating the manner in which the film roll is originally stored on the film spool.
Figure 5:
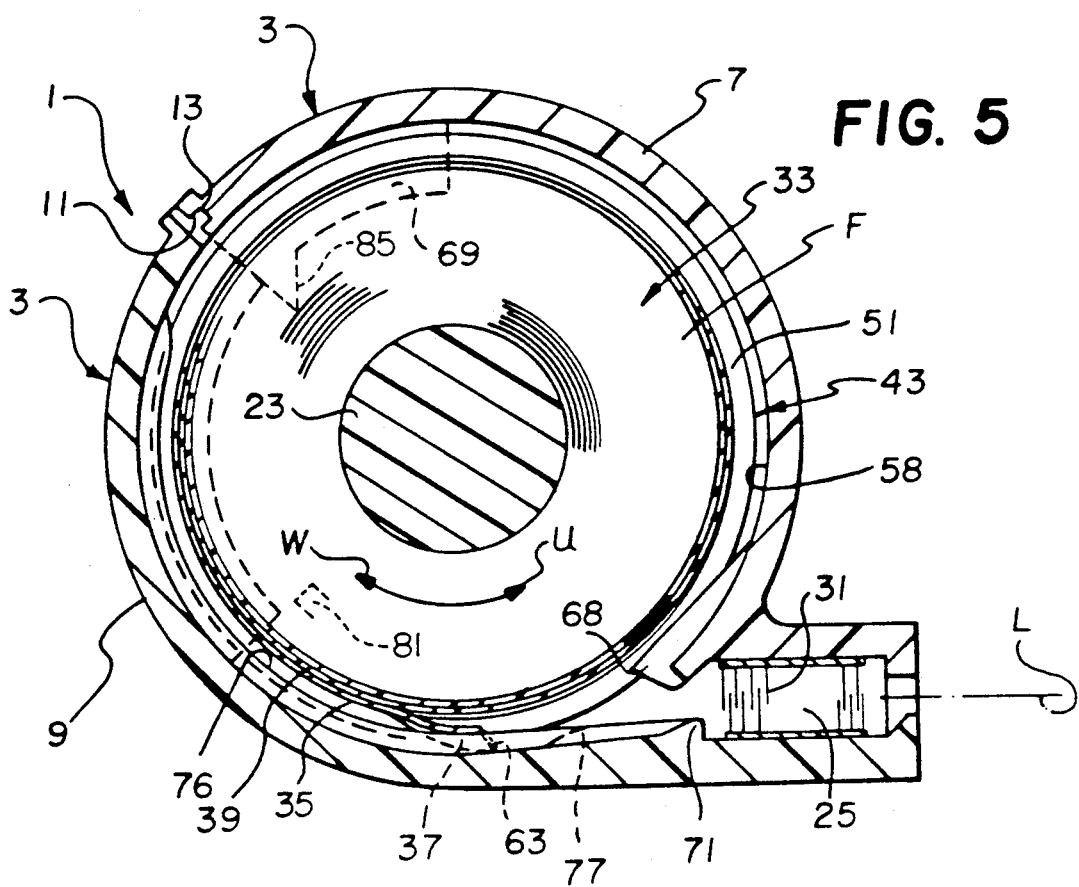
FIGS. 5, 6, and 7 are end views similar to FIG. 4, illustrating the manner in which the film roll is unwound from the film spool.

A film stripper-guide 68 projecting from the interior wall 58 of the cassette half 7 is positioned immediately inward of the inner entrance to the film passageway 25 to be received between the leading end 37 of the film leader (outermost convolution) 35 and the next-inward convolution 39, close to the forward-most tip 65 of the leader, to pick up the leading end and guide it into the film passageway responsive to rotation of the spool core 23 in the unwinding direction U. See FIGS. 1 and 4–7. The leading end 37 will be advanced over the stripper-guide 68 and into the film passageway 25, rather than between the stripper-guide and the next-inward convolution 39, because it is spaced the radial distance D from the latter convolution. Thus, as shown in FIG. 4, the leading end 37 will be located within range of the stripper-guide 68 due to such spacing D from the next-inward convolution 39.

Figure 10:
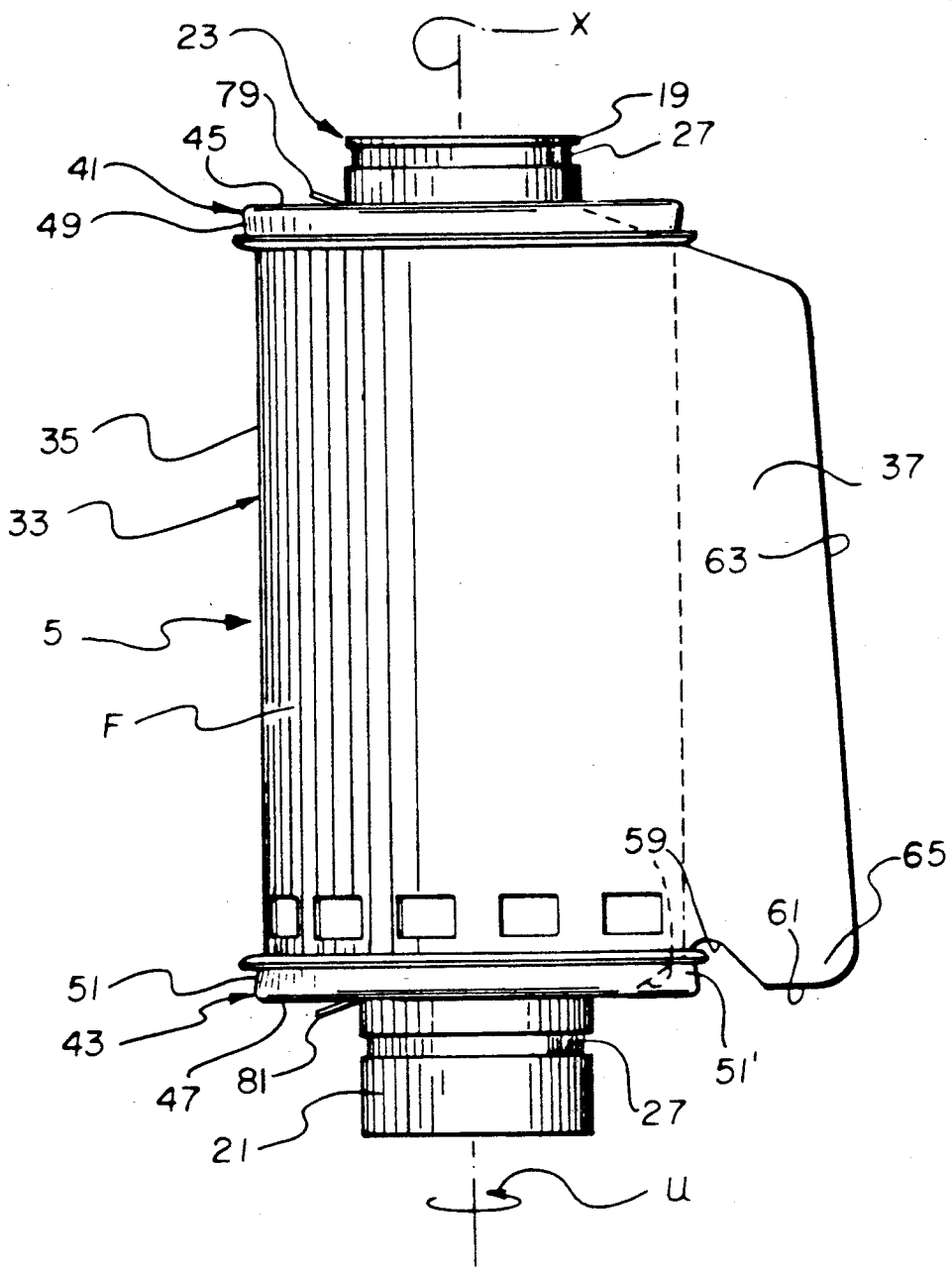
FIGS. 10 and 11 are elevation views similar to FIGS. 8 and 9, illustrating the manner in which the film roll is unwound from the film spool.

When the leading end 37 of the film leader (outermost convolution) 35 is advanced over the stripper-guide 68 responsive to rotation of the spool core 23 in the unwinding direction U, the longitudinal edges 53 and 55 of the leader start to gently flex respective arcuate portions of the two flanges 41 and 43 away from one another, i.e. farther apart, first to allow the notch 59 to separate from the lip section 51', and then to allow successive longitudinal sections of the leader to uncoil from between the flanges and exit through the film passageway 25 to out of the cassette shell 3. See FIGS. 10 and 11. The flexing of the flanges 41 and 43 occurs because the film width $W_F$ between the longitudinal film edges 53 and 55 is slightly greater than the axial spacing $A_S$ between the annular lips 49 and 51. Moreover, successive convolutions of the film roll 33 have a resistance to transverse bowing that is greater than the resistance of the flanges 41 and 43 to be flexed. Two pairs of flat, curved, back-up bearing supports 69, 69 and 70, 70 project from the interior walls 58 of the respective shell halves 7 and 9 to lie flatly against successive arcuate portions of the two disks 45 and 47 as the flanges 41 and 43 are flexed away from one another, to only allow those flange portions separated from the back-up bearing supports to be flexed farther apart. See FIGS. 1, 2 and 4. The back-up bearing supports 69, 69 and 70, 70 are positioned relatively remote from the film passageway 25. Thus, the leader 35 is only allowed to uncoil from between the flanges 41 and 43 relatively close to the passageway 25. See FIG. 7.

A film flattening rib 71 projects from the interior wall 58 of the cassette half 9 in the vicinity of the inner entrance to the film passageway 25 and the stripper-guide 68 to support successive longitudinal sections of the film leader 35, beginning with its leading end 37, substantially flat widthwise as those sections are freed from the flanges 41 and 43, to facilitate movement of the leading end into the passageway. See FIG. 7. The light-trapping plush 31 within the film passageway 25 is elevated along the passageway slightly beyond a longitudinal center line L of the passageway. The film flattening rib 71 as shown in FIG. 4 projects almost to the center line L in order to support successive sections of the film leader 35 substantially flat at the center line.

Two substantially parallel curved film supporting ribs 75 and 76 project from the interior wall 58 of the cassette half 7 to longitudinally extend from the film flattening rib 71 to part-way between the pair of bearing members 69, 69 which project from the same wall. See FIGS. 1, 3, and 4. The film supporting ribs 75 and 76 longitudinally extend the entire location at which the film leader (outermost convolution) 35 can escape the confinement of the flanges 41 and 43, when the leader axially flexes the flanges away from one another. The film supporting ribs 75 and 76 as shown in FIG. 3 are positioned to be slightly spaced from the film leader 35, when the leader is confined within the annular lips 49 and 51. Another film supporting rib 77 projects from the interior wall 58 of the cassette half 7, opposite the stripper-guide 68. The other rib 77 is substantially parallel to and shorter than the first two ribs 75 and 76. All three of the ribs 75-77 longitudinally extend perpendicular to and adjoin the flattening rib 71. See FIG. 1.

Respective resiliently flexible cut-out tabs 79 and 81 integrally formed with the disks 45 and 47 of the flanges 41 and 43 are inclined from the disks at identical acute angles with respect to the winding direction W as shown in FIGS. 1, 4–7, and 10–12. Respective flared end stops 83 and 85 of the two back-up bearing supports 69, 69 are positioned to depress the flexible tabs 79 and 81 when the flanges 41 and 43 are rotated in the unwinding direction U with the spool core 23, to allow the flexible tabs to move over the back-up bearing supports without interrupting rotation of the flanges. Conversely, the flared end stops 83 and 85 will engage the flexible tabs 79 and 81 should the flanges 41 and 43 be rotated in the winding direction W with the spool core 23, to allow the spool core to continue to rotate without the flanges.

OPERATION

Figure 6:
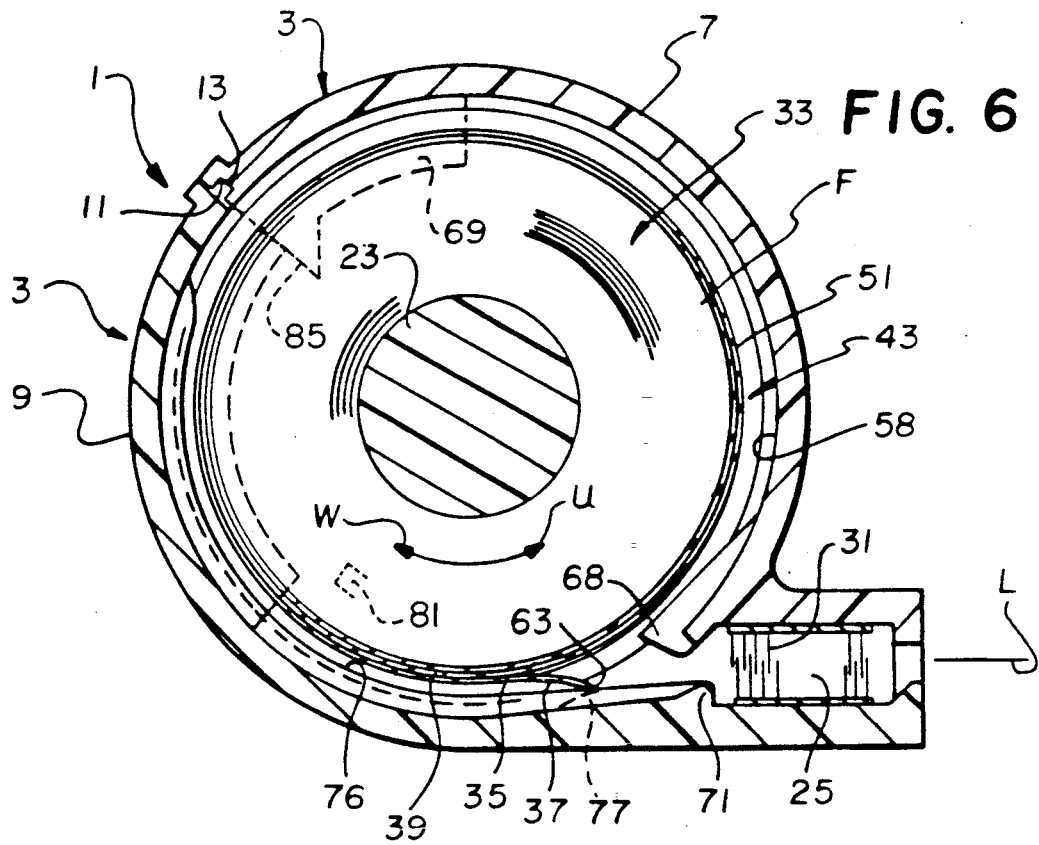
Figure 7:
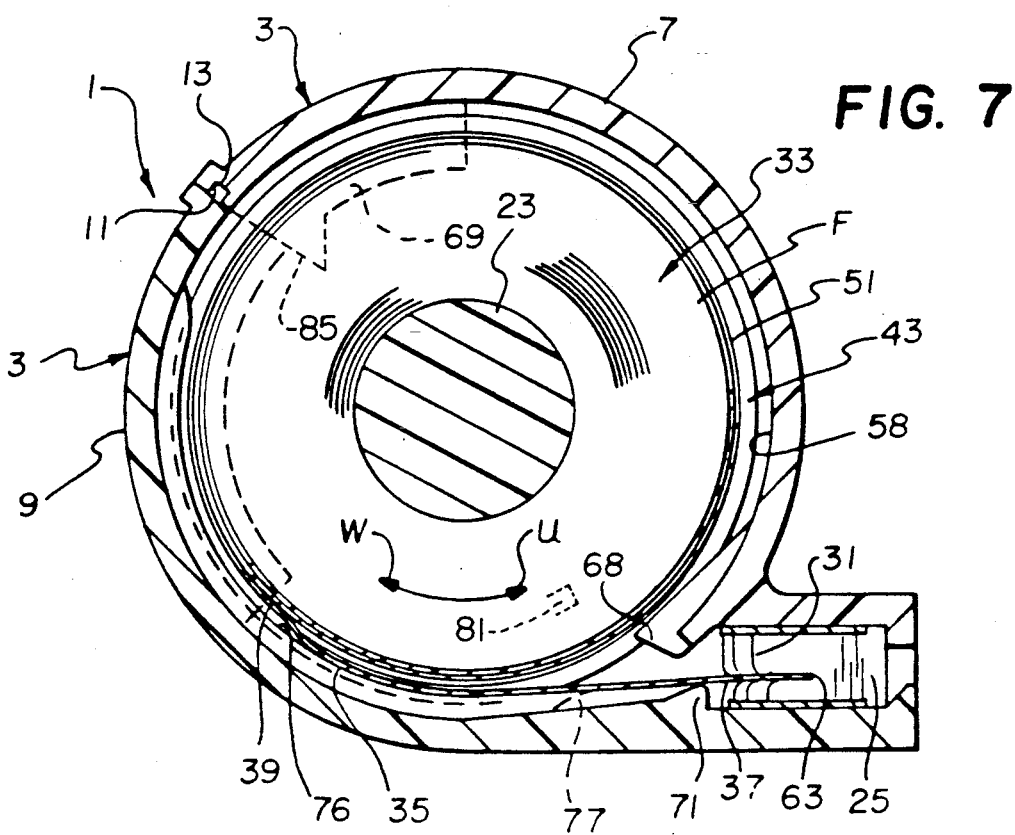
Figure 11:
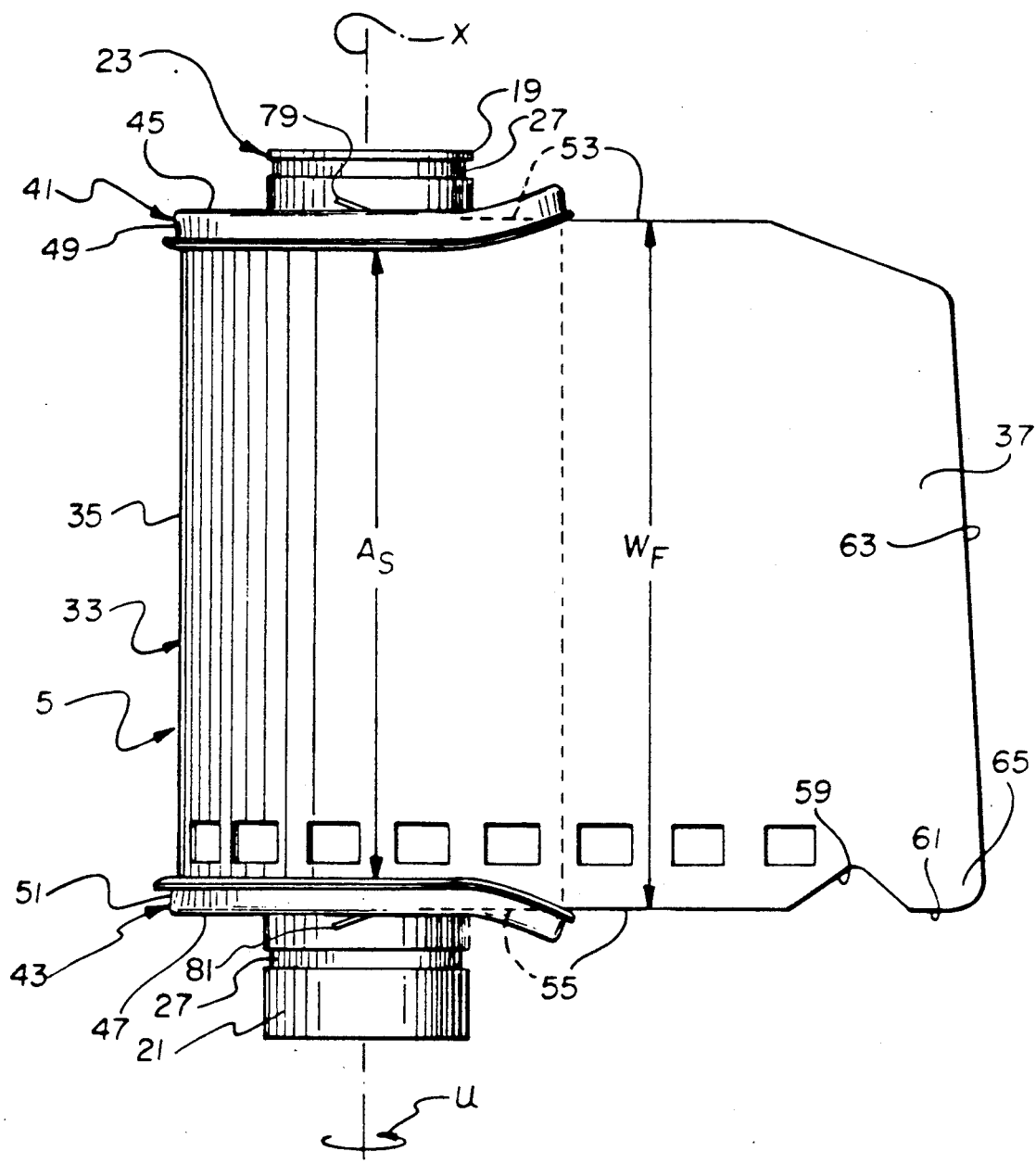

When the spool core 23 is initially rotated in the unwinding direction U, the two flanges 41 and 43 momentarily tend to remain stationary and the film roll 33, since its inner end is attached to the spool core, will expand radially or clock-spring to force the film leader (outermost convolution) 35 firmly against the annular lips 49 and 51 of the flanges. Generally however, before the film roll 33 can be expanded radially to the extent a non-slipping relation would be created between the film leader (outermost convolution) 35 and the annular lips 49 and 51, the hook-like members 67 will have moved along the respective slots 66 (or from the flat areas 66' into the slots 66, and then) into engagement with the two flanges 41 and 43 to fix the flanges to the spool core. Then, further rotation of the spool core 23 will similarly rotate the flanges 41 and 43. As a result, the leading end 37 of the film leader (outermost convolution) 35 will be advanced over the shorter rib 77 and the stripper-guide 68, causing successive arcuate portions of the flanges 41 and 43 to be flexed away from one another as shown in FIG. 11. This first allows the notch 59 to separate from the lip section 51', and then it allows successive longitudinal sections of the film leader 35 to exit from between the flanges through the film passageway 25 to out of the cassette shell 3. Since the stripper-guide 68 initially picks up the leading end 37 of the film leader 35 close to its forward-most tip 65, the forward edge 63 of the leading end will move against the film flattening rib 71 as shown in FIG. 6.

When the film leader 35 is thrust through the film passageway 25 to out of the cassette shell 3, the passageway due to the plush material 31 presents some resistance to advance of the leader. This resistance causes the leader 35 to further flex the flanges 41 and 43 away from one another to, in turn, allow more of the leader to uncoil from between the flanges. If the two ribs 75 and 76 were omitted from the shell half 9, the leader 35 would uncoil against the interior wall 58 of the shell half. As a result, increased torque would be required to rotate the spool core 23 in the film unwinding direction U. However, the two ribs 75 and 76 serve to severely limit the extent to which the leader 35 can uncoil from between the flanges 41 and 43.

If the spool core 23 is rotated in the winding direction W after some length of the filmstrip F has been advanced from the cassette shell 3, the spool core is free to rotate relative to the two flanges 41 and 43 because the hook-like members 67 can move out of the respective slots 66 and therefore out of engagement with the flanges. This permits the flanges 41 and 43 to be independently rotated in the winding direction W by film pull in that direction. However, the flexible tabs 79 and 81 projecting from the disks 45 and 47 of the flanges 41 and 43 will be engaged by the flared end stops 83 and 85 of the back-up bearing supports 69, 69 to prevent further rotation of the flanges in the winding direction W. At the same time, the filmstrip F will be rewound onto the spool core 23 between the flanges 41 and 43.

The invention has been described with reference to a preferred embodiment. However, it will be appreciated that variations and modifications can be effected within the ordinary skill in the art without departing from the scope of the invention.

PARTS LIST FOR FIGS. 1-15

1. film cassette
3. cassette shell
5. film spool
X. axis
U. film unwinding direction
W. film winding direction
7 and 9. shell halves
11 and 13. grooved and stepped portions
15 and 17. circular openings
19 and 21. shorter and longer open-end pieces
23. spool core
25. film passageway
27. annular peripheral groove
29. edge portion
31. plush material
33. film roll
F. filmstrip
35. leader portion (outermost film convolution)
37. leading film end
39. next-inward film convolution
40. innermost film convolution
41 and 43. flanges
45 and 47. disks
49 and 51. annular lips or skirts
53 and 55. longitudinal film edges
56. central holes
57. supports
45' and 47'. inner faces
58. interior curved wall
59. lip-receiving notch
51'. peripheral section
61. leader edge-section
D. radial distance
63. leader foward edge
65. leader forward-most tip
66. concentric arcuate slots
67. hook-like members
67'. beveled end faces
68. film stripper-guide
69 and 70. back-up bearing supports
71. film flattening rib
75, 76, and 77. film supporting ribs
79 and 81. flexible cut-out tabs
83 and 85. flared end-stops

We claim:

1. A film cassette comprising a cassette shell, a spool core supported inside said cassette shell for rotation in an unwinding direction to advance a filmstrip coiled about said spool core out of the cassette shell and in a winding direction to draw said filmstrip into the cassette shell, at least one flange coaxially coupled with said spool core to prevent said filmstrip from uncoiling about the spool core and to permit said flange and the spool core to be rotated relative to each other in the unwinding and winding directions, and cooperating means located on said spool core and said flange for fixing the flange and the spool core to each other to make the flange rotate with the spool core in the unwinding direction but releasing the flange to permit it and the spool core to be rotated relative to each other in the winding direction, is characterized in that:

stop means are connected to said cassette shell; and
said flange has engageable means for being engaged by said stop means when the flange is rotated with said spool core in the winding direction to prevent the flange from further rotating in that direction, whereby said flange will impose a frictional drag on said filmstrip as the filmstrip is wound onto said spool core to cause the filmstrip to be wound tightly to the spool core.

2. A film cassette as recited in claim 1, wherein said engageable means includes an engageable piece integrally formed with said flange to project from the flange but is depressible towards the flange, and said stop means includes a rigid stop projecting from said cassette shell to engage said engageable piece when said flange is rotated with said spool core in the winding direction to prevent further rotation of the flange in that direction and to depress the engageable piece towards the flange to avoid engaging it when the flange is rotated with the spool core in the unwinding direction to permit further rotation of the flange in that direction.

3. A film cassette as recited in claim 2, wherein said engageable piece is resiliently flexible and inclined from said flange at an acute angle with respect to the winding direction to enable the engageable piece to be depressed towards the flange when the flange is rotated in the unwinding direction.

4. A film cassette as recited in claim 1 or 2, wherein said cassette shell includes a stripper positioned to be received underneath a leading end of said filmstrip to free the filmstrip from said flange and a back-up bearing support for the flange integrally formed with said stop means.

5. A film cassette comprising a cassette shell, a spool core supported inside said cassette shell for rotation in an unwinding direction to advance a filmstrip coiled about said spool core out of the cassette shell and in a winding direction to draw said filmstrip into the cassette shell, at least one flange coaxially coupled with said spool core to prevent said filmstrip from uncoiling about the spool core and to permit said flange and the spool core to be rotated relative to each other in the unwinding and winding directions, and cooperating means located on said spool core and said flange for fixing the said flange and the spool core to each other to make the flange rotate with the spool core in the unwinding direction but releasing the flange to permit it and the spool core to be rotated relative to each other in the winding direction, is characterized in that:

said cassette shell and said flange has engagement means for engaging when the flange is rotated with said spool core in the winding direction to prevent the flange from further rotating in that direction, whereby said flange will impose a frictional drag on said filmstrip as the filmstrip is wound onto said spool core to cause the filmstrip to be wound tightly to the spool core.

* * * * *